(12) United States Patent
Savant

(10) Patent No.: US 10,462,091 B1
(45) Date of Patent: Oct. 29, 2019

(54) SYSTEMS AND METHODS FOR REPORTING THE ATTEMPTED TRANSMISSION OF SENSITIVE INFORMATION

(71) Applicant: Symantec Corporation, Mountain View, CA (US)

(72) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 674 days.

(21) Appl. No.: 14/737,532

(22) Filed: Jun. 12, 2015

(51) Int. Cl.
 *H04L 12/58* (2006.01)

(52) U.S. Cl.
 CPC .............. *H04L 51/30* (2013.01); *H04L 51/04* (2013.01)

(58) Field of Classification Search
 CPC ..... H04W 12/00; H04W 12/02; H04W 12/12; H04L 63/14; H04L 63/1408; H04L 63/1416; H04L 63/1425
 See application file for complete search history.

(56) References Cited

U.S. PATENT DOCUMENTS

| | | | | |
|---|---|---|---|---|
| 7,321,761 B2* | 1/2008 | Sharma | .................. | G06T 1/0021 370/328 |
| 7,594,277 B2* | 9/2009 | Zhang | .............. | G06F 17/30616 707/999.003 |
| 8,301,771 B2* | 10/2012 | Singh | .................. | H04L 63/0227 370/349 |
| 8,316,442 B2* | 11/2012 | Prahalad | ............. | G06F 21/6218 713/165 |
| 8,548,864 B2* | 10/2013 | Bhogal | .............. | G06Q 30/0641 705/26.1 |
| 8,671,455 B1* | 3/2014 | Zhu | ........................ | G06F 21/554 726/26 |
| 8,752,180 B2* | 6/2014 | Barile | .................... | G06F 21/566 713/152 |
| 8,819,772 B2* | 8/2014 | Bettini | ................ | H04L 63/0245 709/219 |
| 8,826,443 B1* | 9/2014 | Raman | .................. | G06F 11/004 726/26 |
| 8,832,048 B2* | 9/2014 | Lim | ..................... | G06F 17/3089 707/694 |
| 8,875,284 B1* | 10/2014 | Newstadt | ............ | H04L 63/1425 726/22 |
| 8,887,289 B1* | 11/2014 | Hullale | ............... | G06F 21/6263 726/22 |
| 8,984,640 B1* | 3/2015 | Emigh | ................ | H04L 63/1441 726/13 |
| 9,081,981 B2* | 7/2015 | Lim | ..................... | G06F 21/6218 |

(Continued)

*Primary Examiner* — Ranodhi Serrao
(74) *Attorney, Agent, or Firm* — FisherBroyles, LLP

(57) ABSTRACT

The disclosed computer-implemented method for reporting the attempted transmission of sensitive information may include (1) identifying an attempt by at least one software program running on a computing device to transmit data to one or more intended recipients, (2) determining that the data of the attempted transmission includes sensitive information, (3) identifying an intended recipient of the attempted transmission, and (4) notifying a user of the computing device both that the attempted transmission includes sensitive information and of the intended recipient of the attempted transmission. Various other methods, systems, and computer-readable media are also disclosed.

20 Claims, 10 Drawing Sheets

(56) References Cited

U.S. PATENT DOCUMENTS

| | | | |
|---|---|---|---|
| 9,406,048 B2* | 8/2016 | Meister | G06Q 10/107 |
| 2006/0005247 A1* | 1/2006 | Zhang | G06F 17/30616 |
| | | | 726/26 |
| 2006/0140409 A1* | 6/2006 | Sharma | G06T 1/0021 |
| | | | 380/270 |
| 2007/0094394 A1* | 4/2007 | Singh | H04L 63/0227 |
| | | | 709/226 |
| 2007/0156694 A1* | 7/2007 | Lim | G06F 21/6218 |
| 2008/0060051 A1* | 3/2008 | Lim | G06F 17/3089 |
| | | | 726/1 |
| 2009/0183257 A1* | 7/2009 | Prahalad | G06F 21/6218 |
| | | | 726/22 |
| 2010/0212010 A1* | 8/2010 | Stringer | G06F 21/52 |
| | | | 726/22 |
| 2010/0251369 A1* | 9/2010 | Grant | G06F 21/554 |
| | | | 726/23 |
| 2010/0306850 A1* | 12/2010 | Barile | G06F 21/577 |
| | | | 726/25 |
| 2012/0011192 A1* | 1/2012 | Meister | G06Q 10/107 |
| | | | 709/203 |
| 2012/0102568 A1* | 4/2012 | Tarbotton | G06F 21/552 |
| | | | 726/23 |
| 2012/0143728 A1* | 6/2012 | Bhogal | G06Q 30/0641 |
| | | | 705/27.1 |
| 2013/0347094 A1* | 12/2013 | Bettini | H04L 63/0245 |
| | | | 726/11 |
| 2015/0118992 A1* | 4/2015 | Wyatt | H04W 12/08 |
| | | | 455/410 |
| 2015/0242633 A1* | 8/2015 | Galil | G06F 21/552 |
| | | | 726/1 |

\* cited by examiner

SYSTEMS AND METHODS FOR REPORTING THE ATTEMPTED TRANSMISSION OF SENSITIVE INFORMATION

BACKGROUND

Increasingly, application developers and cloud-service providers collect various types of personal information. Mobile applications, in particular, may access and collect personal information about application users, their purchases, movements, contacts, daily schedule, interests, and even personal habits. For example, many application developers and cloud-service providers base their businesses on collecting personal information. A common business model is to provide a free or low-cost application or service to attract a large number of users, gather personal information from these users, and sell the information collected to advertisers or market researchers.

Although users may grant access to their personal data when installing an application or creating a user account, many remain unaware of what personal data is being collected and where it is going. Users may be surprised, for example, to discover that a game they play on a smartphone may collect contact information from their address book, track their physical location, and send this information to the game developer, who may be located in another country or who may store the collected data with a cloud-storage service located in yet another country. To further complicate matters, each legal jurisdiction may have different laws governing data privacy and when data must be disclosed to government entities.

Data collection and privacy issues become even more complex when the data collected is proprietary to a business or other organization that may have policies and/or legal or contractual obligations governing information privacy. Accordingly, the instant disclosure identifies and addresses a need for additional and improved systems for reporting the attempted transmission of sensitive information.

SUMMARY

As will be described in greater detail below, the instant disclosure describes various systems and methods for reporting the attempted transmission of sensitive information by identifying attempts to transmit sensitive information, identifying the intended recipient of the information, and notifying the user of a computing device of both the attempted data transmission and the intended recipient. In one example, the notification may be presented in the form of a postcard as a metaphor to help users understand which applications may be attempting to transmit sensitive data, the data being transmitted, and/or the intended recipient. The systems and methods described herein may also summarize several attempted transmissions and present the summarized data categorized, for example, by the sending application, intended recipient, or data item.

In one example, a computer-implemented method for accomplishing the above-identified tasks may include (1) identifying an attempt by one or more software programs running on a computing device to transmit data to one or more intended recipients, (2) determining that the data of the attempted transmission includes sensitive information, (3) identifying an intended recipient of the attempted transmission, and (4) notifying a user of the computing device both that the attempted transmission includes sensitive information and of the intended recipient of the attempted transmission. In some examples, notifying the user of the computing device may include displaying a representation of a postcard that includes (1) a destination address, (2) a return address, and/or (3) a message.

In one embodiment, the destination address may include the intended recipient of the attempted transmission. In one embodiment, the destination address may further include (1) a physical location of the intended recipient, (2) a physical location of a data store used by the intended recipient, (3) an organization having access to data stored by the intended recipient, (4) a reputation of the intended recipient, and/or (5) a data privacy policy of the intended recipient.

In one embodiment, the return address may include the software program that attempted to transmit the data. In one embodiment, the message may include a description of the sensitive information. In some examples, the computer-implemented method may further include identifying several attempts to transmit sensitive information that each share one or more common elements that may include the intended recipient, the software program that attempted to transmit the data, and/or the sensitive information. In these examples, displaying the representation of the postcard may include displaying a summary of the identified attempts to transmit sensitive information categorized by the common element.

In some examples, displaying the representation of the postcard may include displaying (1) the number of attempts to transmit the sensitive information, (2) the number of software programs that attempted to transmit the data, and/or (3) the number of intended recipients of the data. In some examples, identifying the intended recipient of the attempted transmission may include identifying an owner of a network resource associated with the intended recipient, such as (1) a network address, (2) a computing device, (3) an Internet domain, and/or (4) an email account.

In one embodiment, a system for implementing the above-described method may include several modules stored in memory, such as (1) an identification module that identifies an attempt by one or more software programs running on a computing device to transmit data to one or more intended recipients, (2) a security module that determines that the data of the attempted transmission includes sensitive information, (3) an analysis module that identifies an intended recipient of the attempted transmission, and/or (4) a notification module that notifies a user of the computing device both that the attempted transmission includes sensitive information and of the intended recipient of the attempted transmission. The system may also include at least one physical processor configured to execute the identification module, the security module, the analysis module, and the notification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an attempt by one or more software programs running on the computing device to transmit data to one or more intended recipients, (2) determine that the data of the attempted transmission includes sensitive information, (3) identify an intended recipient of the attempted transmission, and (4) notify a user of the computing device both that the attempted transmission includes sensitive information and of the intended recipient of the attempted transmission.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
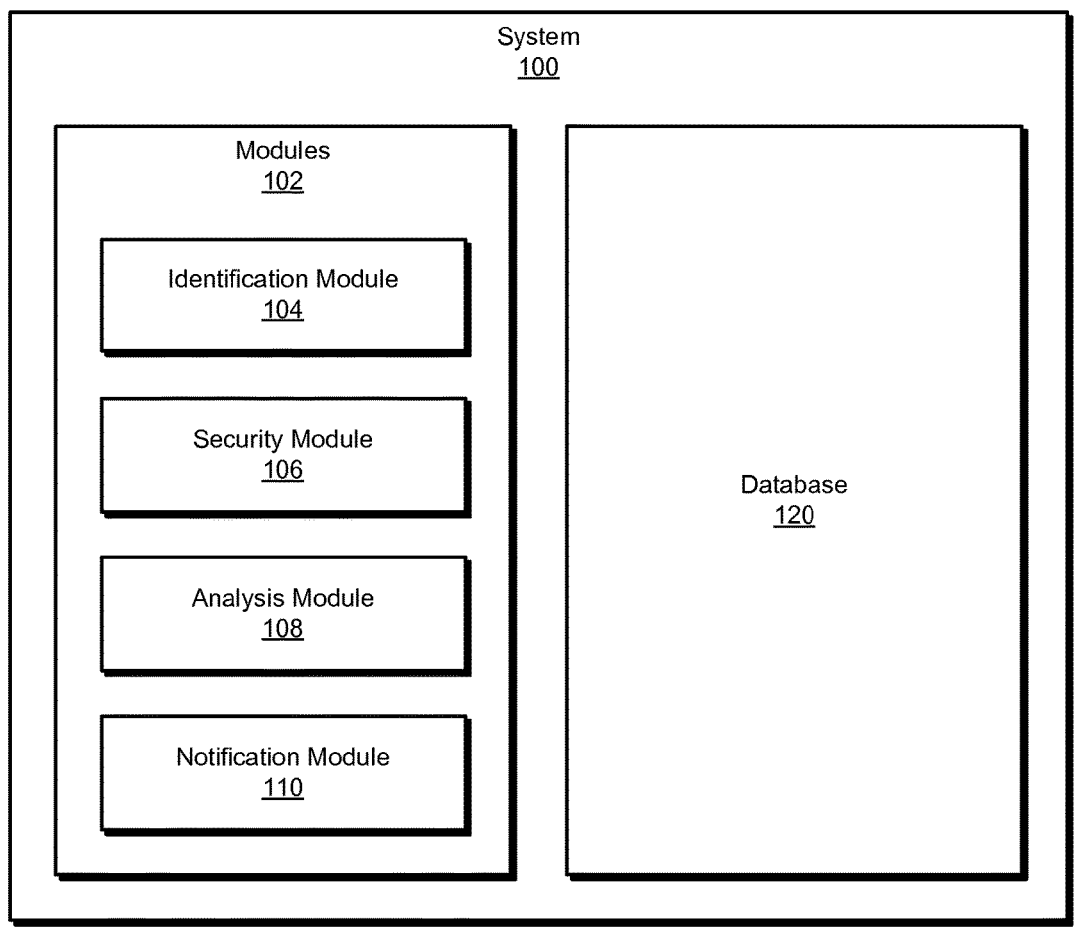
FIG. 1 is a block diagram of an exemplary system for reporting the attempted transmission of sensitive information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for reporting the attempted transmission of sensitive information. As will be explained in greater detail below, the systems and methods described herein may identify attempts to transmit sensitive data and identify the intended recipients. In some examples, these systems and methods may report attempts to transmit sensitive data using a postcard display that makes use of a familiar metaphor to help users understand which software programs are attempting to transmit sensitive data, what data the program is attempting to transmit, and the intended destination for the data. Additionally, the systems and methods described herein may aggregate multiple attempts to transmit sensitive information and enable the user to view summaries of the aggregated events categorized by the sending program, the intended recipient, or the information intended to be transmitted. The systems and methods described herein may also provide security information about the intended recipient, such as the physical location of the intended recipient's data store, other organizations that may have access to the stored data, etc.

The following will provide, with reference to FIGS. 1-2 and 4-8, detailed descriptions of exemplary systems for reporting the attempted transmission of sensitive information. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 9 and 10, respectively.

FIG. 1 is a block diagram of exemplary system 100 for reporting the attempted transmission of sensitive information. As illustrated in this figure, exemplary system 100 may include one or more modules 102 for performing one or more tasks. For example, and as will be explained in greater detail below, exemplary system 100 may include an identification module 104 that may identify an attempt by one or more software programs running on the computing device to transmit data to one or more intended recipients. Exemplary system 100 may additionally include a security module 106 that may determine that the data of the attempted transmission includes sensitive information. Exemplary system 100 may also include an analysis module 108 that may identify an intended recipient of the attempted transmission. Exemplary system 100 may additionally include a notification module 110 that may notify a user of the computing device both that the attempted transmission includes sensitive information and of the intended recipient of the attempted transmission. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 402, and/or server 406), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store attempted data transmission event records. Database 120 may represent portions of a single database or computing device or a plurality of databases or computing devices. For example, database 120 may represent a portion of server 406 in FIG. 4, computing system 910 in FIG. 9, and/or portions of exemplary network architecture 1000 in FIG. 10. Alternatively, database 120 in FIG. 1 may represent one or more physically separate devices capable of being accessed by a computing device, such as server 406 in FIG. 4, computing system 910 in FIG. 9, and/or portions of exemplary network architecture 1000 in FIG. 10.

Figure 2:
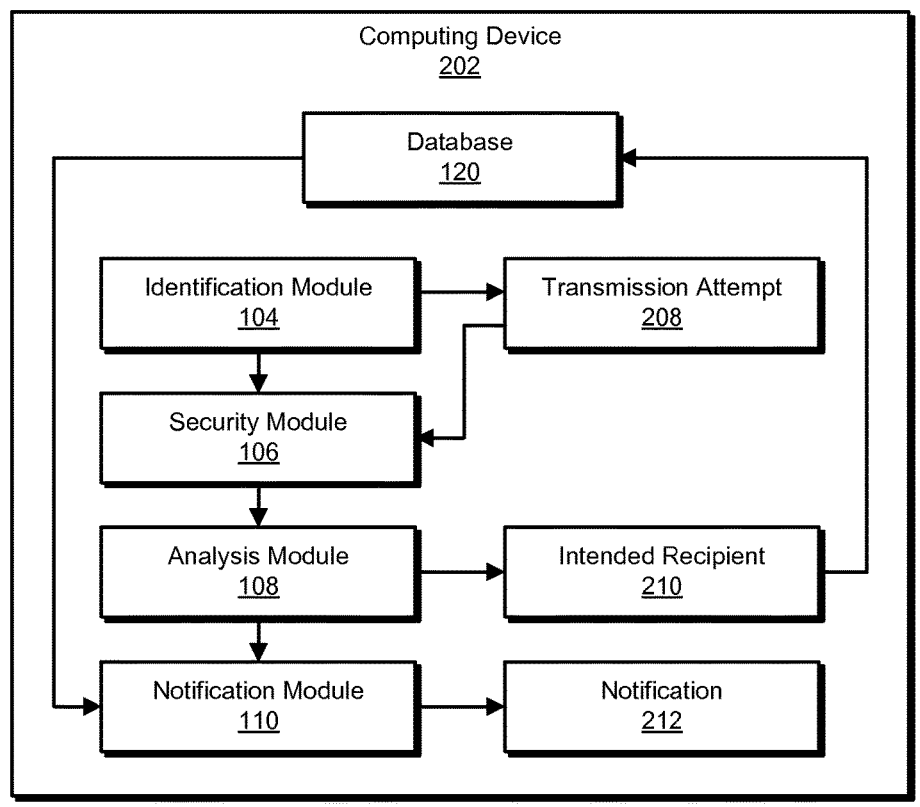
FIG. 2 is a block diagram of an additional exemplary system for reporting the attempted transmission of sensitive information.
Figure 4:
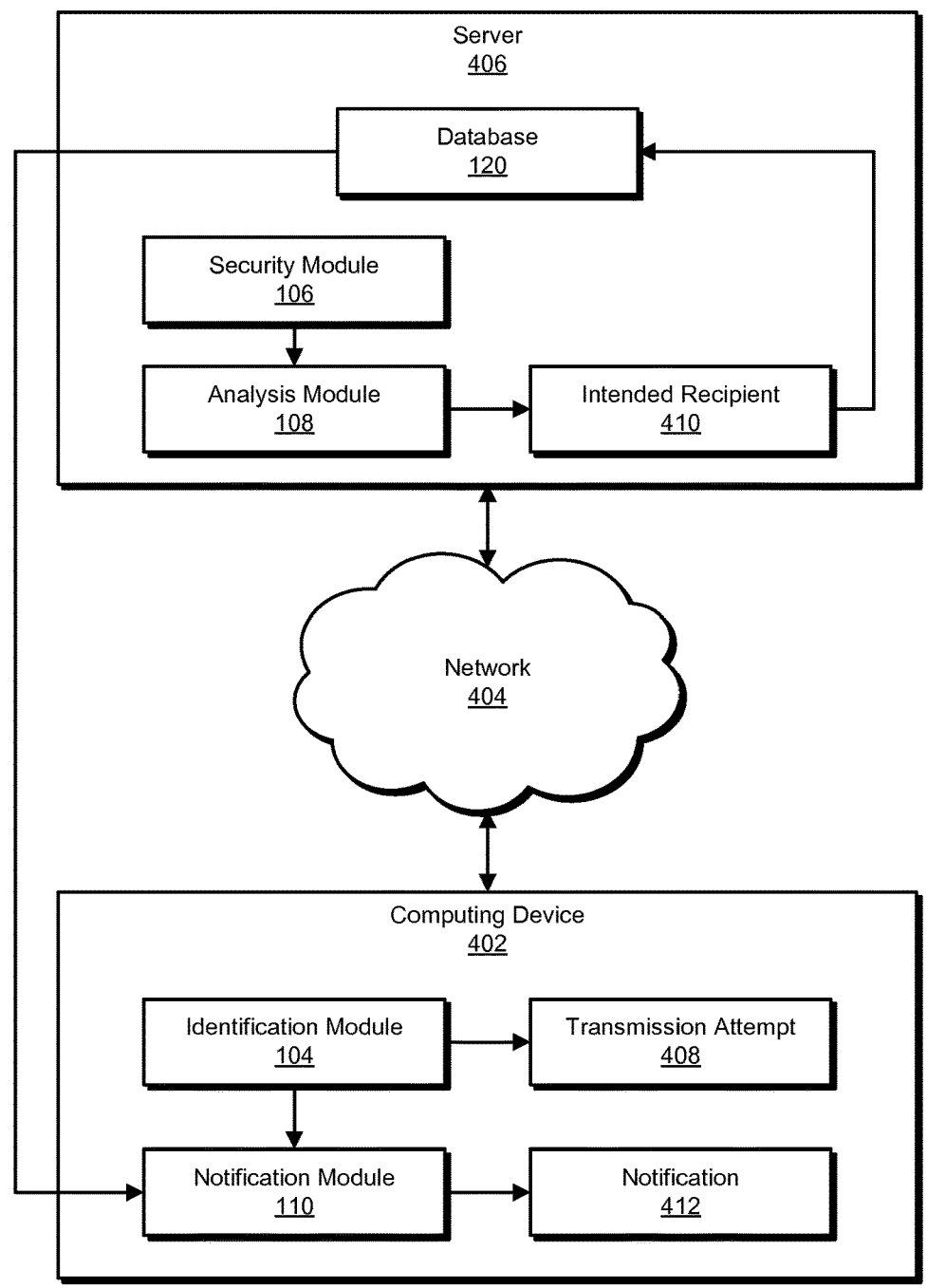
FIG. 4 is a block diagram of an exemplary computing system for reporting the attempted transmission of sensitive information.

Exemplary system 100 in FIG. 1 may be implemented in a variety of ways. For example, all or a portion of exemplary system 100 may represent portions of exemplary system 200 in FIG. 2 or exemplary system 400 in FIG. 4. As shown in FIG. 2, system 200 may include a computing device 202. Alternatively, as shown in FIG. 4, system 400 may include a computing device 402 in communication with a server 406 via a network 404. In one example, computing device 202 may be programmed with one or more of modules 102 and/or may store all or a portion of the data in database 120. Additionally or alternatively, computing device 402 and/or server 406 may be programmed with one or more of modules 102 and/or may store all or a portion of the data in database 120.

In one embodiment, one or more of modules 102 from FIG. 1 may, when executed by at least one processor of computing device 202, computing device 402, and/or server 406, enable computing device 202, computing device 402, and/or server 406 to report the attempted transmission of sensitive information. For example, and as will be described in greater detail below, one or more of modules 102 may cause computing device 202, computing device 402, and/or server 406 to report the attempted transmission of sensitive information. As depicted in FIG. 2, computing device 202 may include all of modules 102 and database 120. For example, and as will be described in greater detail below, identification module 104 may identify an attempt by one or more software programs running on computing device 202 to transmit data to one or more intended recipients. In this example, security module 106 may determine that the data of the attempted transmission includes sensitive information. Analysis module 108 may then identify an intended recipient of the attempted transmission. Finally, notification module 110 may notify a user of computing device 202 both that the attempted transmission includes sensitive information and of the intended recipient of the attempted transmission.

As depicted in FIG. 4, computing device 402 and server 406, in communication via network 404, may include one or more of modules 102. For example, identification module 104 may identify an attempt by one or more software programs running on computing device 402 to transmit data to one or more intended recipients. In this example, security module 106, running on server 406, may determine that the data of the attempted transmission includes sensitive information. Analysis module 108, running on server 406, may then identify an intended recipient of the attempted transmission. Finally, notification module 110, running on computing device 402, may notify a user of computing device 402 both that the attempted transmission includes sensitive information and of the intended recipient of the attempted transmission.

Computing device 202 and/or computing device 402 generally represent any type or form of computing device capable of reading computer-executable instructions. Examples of computing device 202 and computing device 402 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device.

Server 406 generally represents any type or form of computing device that is capable of receiving, comparing, storing, and transmitting data. Examples of server 406 include, without limitation, application servers and database servers configured to provide various database services and/or run certain software applications.

Network 404 generally represents any medium or architecture capable of facilitating communication or data transfer. Examples of network 404 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 404 may facilitate communication or data transfer using wireless or wired connections. In one embodiment, network 404 may facilitate communication between computing device 402 and server 406.

Figure 3:
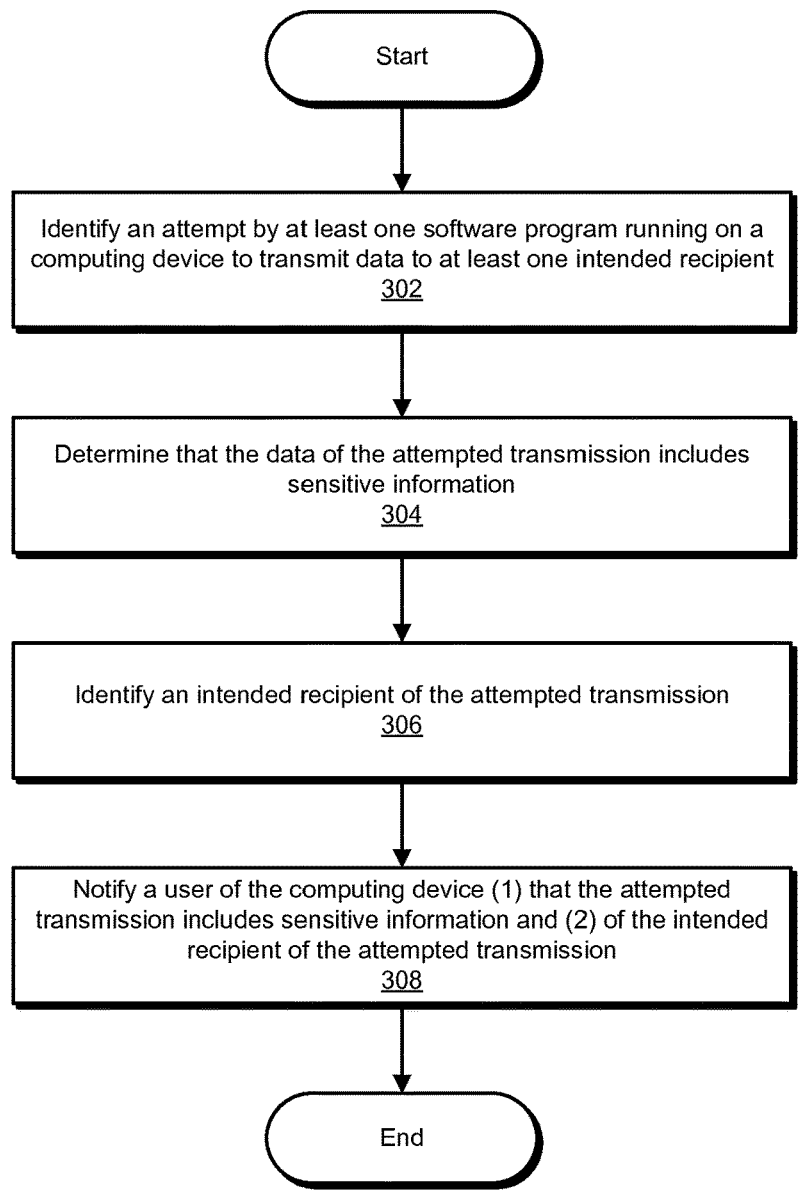
FIG. 3 is a flow diagram of an exemplary method for reporting the attempted transmission of sensitive information.

FIG. 3 is a flow diagram of an exemplary computer-implemented method 300 for reporting the attempted transmission of sensitive information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, computing system 910 in FIG. 9, and/or portions of exemplary network architecture 1000 in FIG. 10.

As illustrated in FIG. 3, at step 302, one or more of the systems described herein may identify an attempt by one or more software programs running on the computing device to transmit data to one or more intended recipients. For example, identification module 104 may, as part of computing device 202 in FIG. 2 or computing device 402 in FIG. 4, identify a transmission attempt 408 by one or more software programs running on computing device 202 or computing device 402 to transmit data to one or more intended recipients.

Identification module 104 may identify an attempt by a software program to transmit data in a variety of ways. For example, identification module 104 may intercept calls to application programming interfaces (APIs) provided by the computing device's operating system to transmit data. In another example, identification module 104 may monitor communication channels on the computing device, such as networking hardware or protocols, to detect attempts to transmit data.

At step 304, one or more of the systems described herein may determine that the data of the attempted transmission includes sensitive information. For example, security module 106 may, as part of computing device 202 in FIG. 2 or server 406 in FIG. 4, determine that the data of transmission attempt 408 includes sensitive information.

As used herein, the phrase "sensitive information" may refer to any data that a user and/or company would not want sent outside of a computing device or system without knowledge and/or permission of the user and/or company. Examples of sensitive information may include, without limitation, a name, a phone number, a device identifier, an email address, a contact, a browser history, a browser cookie, a phone history, a message history, location information (e.g., global positioning system information), financial information (e.g., credit card numbers, bank account numbers, etc.), confidential information, privileged information, personal information (e.g., a social security number, a driver's license number, etc.), sensitive corporate information (e.g., intellectual property, customer lists, product roadmaps, etc.), usage information, and/or any other type of sensitive data.

Security module 106 may determine that the data of the attempted transmission includes sensitive information in a variety of ways. For example, security module 106 may utilize knowledge of the software program attempting to transmit the data in analyzing the content and/or intended recipient of the data to determine whether the data includes sensitive information. Security module 106 may also analyze the data of the attempted transmission itself (using, e.g., keyword searches, hash comparisons, image-detection algorithms, etc.) to determine whether the transmitted data includes sensitive information. In another example, security module 106 may monitor data collection activities of software programs running on the computing device to detect when a software program accesses personal data or other sensitive information. For example, security module 106 may monitor attempts to access a global positioning system (GPS) device to obtain the user's current location or attempts to read a mobile phone call history to obtain information about a user's frequent contacts.

At step 306, one or more of the systems described herein may identify an intended recipient of the attempted transmission. For example, analysis module 108 may, as part of computing device 202 in FIG. 2 or server 406 in FIG. 4, identify intended recipient 410 of transmission attempt 408.

Analysis module 108 may identify an intended recipient of the attempted transmission in a variety of ways. For example, analysis module 108 may rely on knowledge of the software program attempting to transmit the data to determine the intended destination. For example, analysis module 108 may access a database of software application information to determine what data a specific software program collects and transmits, and where the collected data is transmitted and stored.

In some examples, analysis module 108 may identify the intended recipient of the attempted transmission by identifying an owner of a network resource associated with the intended recipient, such as (1) a network address, (2) a computing device, (3) an Internet domain, and/or (4) an email account. For example, analysis module 108 may, as part of computing device 202 in FIG. 2 or server 406 in FIG. 4, identify intended recipient 410 of transmission attempt 408 by querying an Internet "whois" database to identify the owner of the network address or Internet domain to which transmission attempt 408 is directed. In another example, analysis module 108 may identify the intended recipient 410 of transmission attempt 408 by identifying the individual or organizational owner of an email address to which an attempted transmission of sensitive information is addressed.

At step 308, one or more of the systems described herein may notify a user of the computing device. For example, notification module 110 may, as part of computing device 202 in FIG. 2 or computing device 402 in FIG. 4, notify a user of computing device 202 or computing device 402 both that transmission attempt 408 includes sensitive information and of the intended recipient 410 of the attempted transmission.

Notification module 110 may notify the user of the computing device in a variety of ways. For example, notification module 110 may display a pop-up message at the time security module 106 determines an application is attempting to transmit sensitive information. In one example, this message may include a button or other user-interface component that the user may activate to block the transmission.

Figure 5:
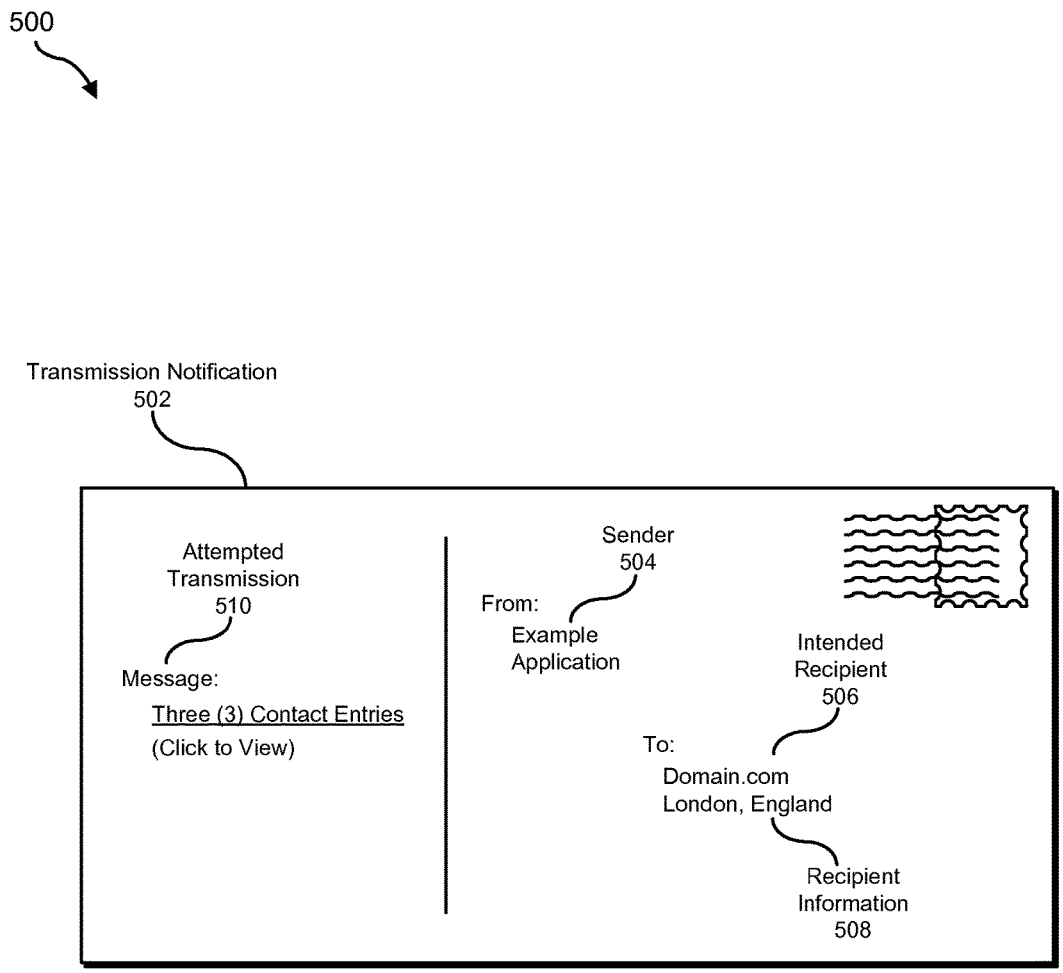
FIG. 5 is a block diagram of a transmission notification for reporting the attempted transmission of sensitive information.

In some examples, notification module 110 may notify the user of the computing device by displaying a representation of a postcard that includes (1) a destination address, (2) a return address, and/or (3) a message. FIG. 5 is a block diagram of an exemplary transmission notification 502 for reporting the attempted transmission of sensitive information. In this example, transmission notification 502 may include fields for a sender 504, intended recipient 506, additional recipient information 508, and the attempted transmission 510. In one embodiment, the destination address of the postcard display may include the intended recipient 506 of the attempted transmission. In addition, the return address or sender 504 field of the postcard display may include the software program that attempted to transmit the data. Finally, attempted transmission 510 (i.e., the message field of the postcard display) may include a description of the sensitive information or display the sensitive information itself. In these examples, by using the familiar metaphor of a postcard, the systems and methods described herein may enable users to quickly and easily identify which applications may be attempting to transmit sensitive data, the data being transmitted, and/or the intended recipient.

Each field of the postcard representation may display a variety of information, summarized in a variety of ways. For example, in one embodiment the destination address in the postcard representation may display (1) a physical location of the intended recipient, (2) a physical location of a data store used by the intended recipient, (3) an organization that has access to data stored by the intended recipient, (4) a reputation of the intended recipient, and/or (5) a data privacy policy of the intended recipient.

As shown in FIG. 5, recipient information 508 may also include additional information about the intended recipient that may help the user assess the reputation or reliability of the intended recipient and/or the security of the sensitive information included in the attempted transmission. The term "reputation," as used herein, generally refers to estimates, indications, and/or measures of the trustworthiness, prevalence, prominence, and/or community opinion of the intended recipient. An individual's or organization's reputation may, for example, be based on recommendations by peers, members of a community, or experts, and/or by measures of positive and negative media reports. In addition, the term "data privacy policy," as used herein, generally refers to a statement or legal disclosure of some or all the ways an individual or organization gathers, uses, manages, and discloses client data. Many jurisdictions have legal requirements for organizations that have access to personal information to periodically report the organization's data privacy policy to the organization's clients. Organizations often require clients to state that they have read the organization's data privacy policy and agree to its terms when granting access to personal information, although in practice such policy documents are seldom read.

In some examples, the systems described herein may identify several attempts to transmit sensitive information that each share one or more common elements, such as (1) the intended recipient of the attempted transmission, (2) the software program that attempted to transmit the data, and/or (3) the sensitive information itself. In these examples, the postcard representation may display a summary of the identified attempts to transmit sensitive information, categorized by the common element. For example, identification module 104 may, as part of computing device 202 in FIG. 2 or computing device 402 in FIG. 4, identify several transmission attempts 408. Analysis module 108 may then, as part of computing device 202 in FIG. 2 or server 406 in FIG. 4, store information regarding these transmission attempts 408 in database 120. Notification module 110 may then query database 120 to obtain records of transmission attempts 408 with common elements and display a summary of these transmission attempts 408, categorized by these common elements. For example, and as illustrated in FIGS. 5-8, notification module 110 may display (1) the number of attempts to transmit the sensitive information, (2) the number of software programs that attempted to transmit the data, and/or (3) the number of intended recipients of the data. In this example, the user may identify and/or obtain additional information about each individual attempt, program, and/or recipient by selecting or clicking the summary link.

Figure 6:
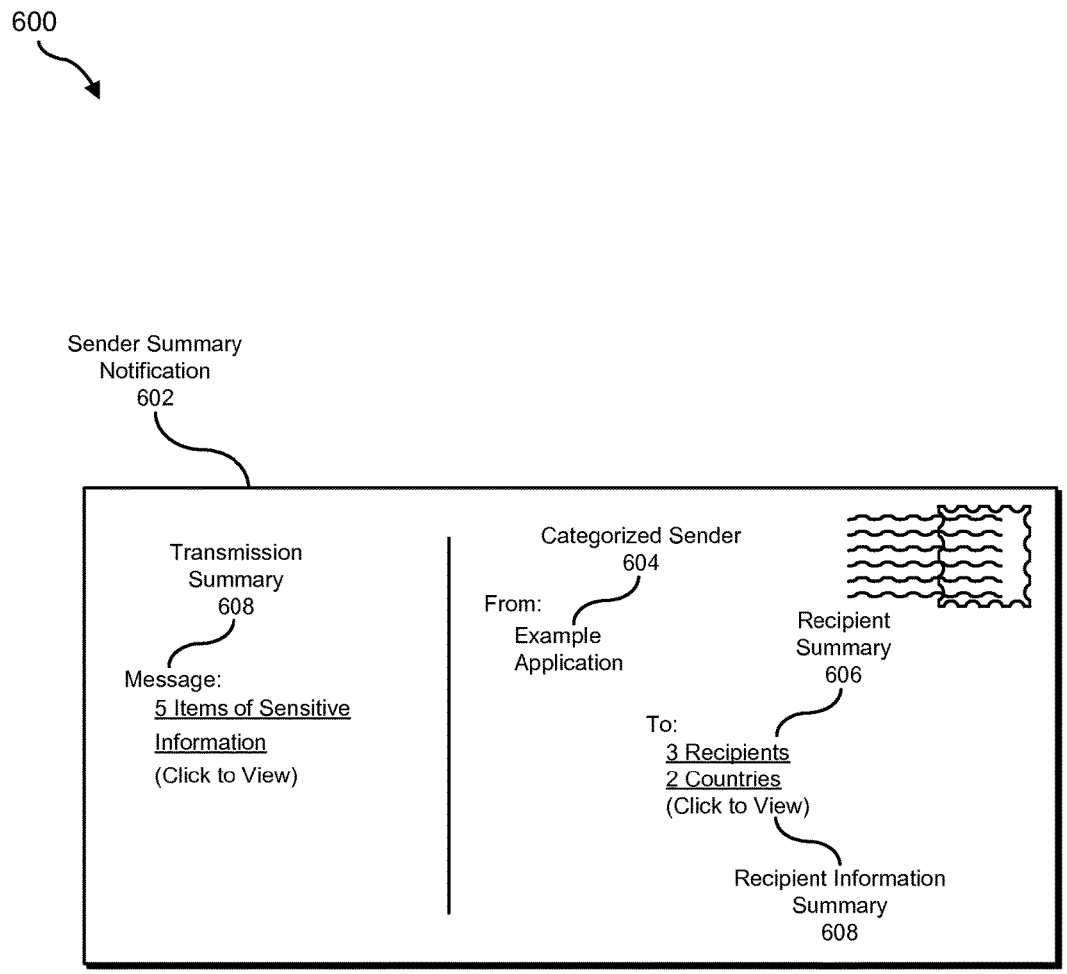
FIG. 6 is a block diagram of a sender summary notification for reporting the attempted transmission of sensitive information, summarized by sender.

Notification module 110 may use the representation of a postcard to summarize attempts to transmit sensitive information in a variety of ways. For example, FIG. 6 is a block diagram of a sender summary notification 602 for reporting the attempted transmission of sensitive information, summarized by sender. Summary notification 602 may display a variety of elements, such as a categorized sender 604 that displays the name of the application that attempted to transmit the sensitive information summarized in the postcard display. Summary notification 602 may also include a recipient summary 606 that displays the number of recipients to whom the sending application attempted to send sensitive information. In addition, summary notification 602 may include a recipient information summary 608 that provides additional information about the intended recipients, such as their physical locations. Summary notification 602 may also include a transmission summary 608 that displays a description of the sensitive information the application attempted to transmit to the intended recipients.

Figure 7:
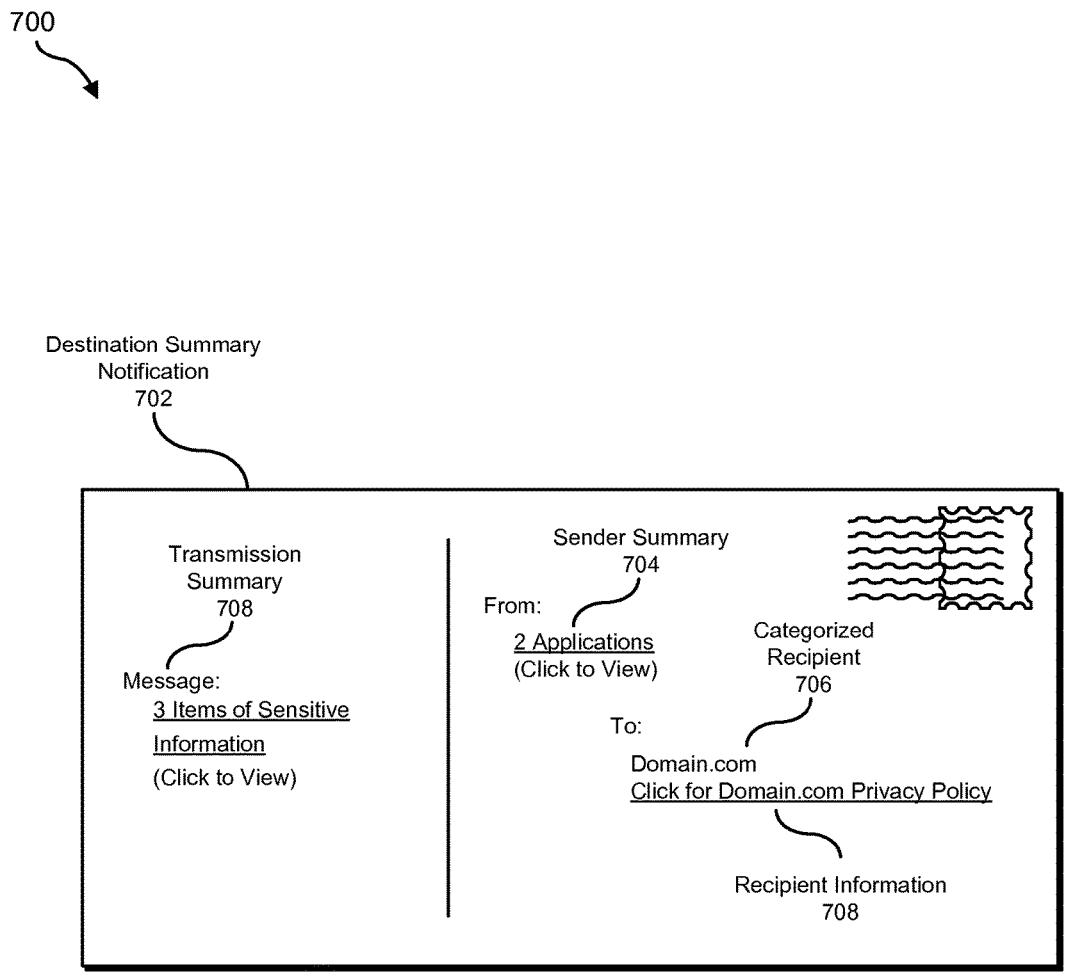
FIG. 7 is a block diagram of a destination summary notification for reporting the attempted transmission of sensitive information, summarized by intended recipient.

In another example, notification module 110 may use the representation of a postcard to display a summary of several attempted transmissions by one or more applications, categorized by the intended recipient. FIG. 7 is a block diagram of a destination summary notification 702 for reporting the attempted transmission of sensitive information, summarized by intended recipient. In this example, destination summary notification 702 may include a sender summary 704 that displays the number of applications or a list of applications that attempted to send sensitive information to the intended recipient. Destination summary notification 702 may also include a categorized recipient 706 that displays the name of the intended recipient and recipient information 708 that may provide additional information about the intended recipient. Destination summary 706 may also include a transmission summary 708 that displays a description or the number of items of sensitive information that the applications included in sender summary 704 attempted to send to the intended recipient.

Figure 8:
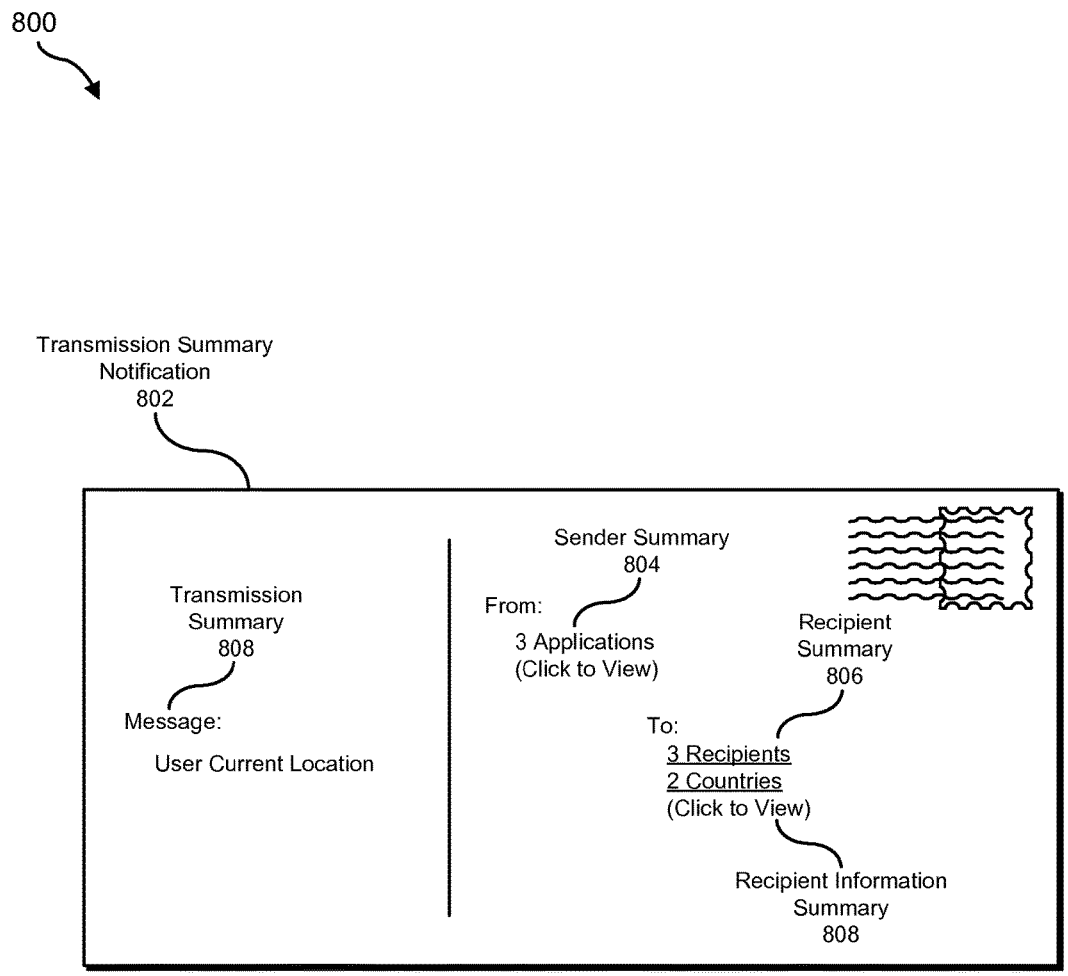
FIG. 8 is a block diagram of a transmission summary notification for reporting the attempted transmission of sensitive information, summarized by message.

In another example, notification module 110 may use a representation of a postcard to display a summary of several attempts by one or more applications to transmit a single item of sensitive information to several recipients. FIG. 8 is a block diagram of a transmission summary notification 802 for reporting the attempted transmission of sensitive information, summarized by message. In this example, transmission summary notification 802 may include a sender summary 804 that displays a number or list of applications that attempted to send the item of sensitive information. Transmission summary notification 802 may also include a recipient summary 806 that may enumerate or list the intended recipients of the item of sensitive information and a recipient information summary 808 that may provide additional information about the intended recipients. In addition, transmission summary notification 802 may include a transmission summary 808 that may describe or display the item of sensitive information that the applications included in sender summary 804 attempted to transmit to the intended recipients included in recipient summary 806.

As described above, the systems and methods described herein may report the attempted transmission of sensitive information to the user of a computing device by identifying attempts to transmit data, determining that the data includes sensitive information, identifying the intended recipient of the sensitive information, and notifying the user of the computing device both that a software program is attempting to transmit sensitive information and of the intended recipient of the sensitive information. In some examples, these systems and methods may display this information in the form of a postcard that identifies the application attempting to send the sensitive information, the intended recipient, and/or the sensitive information included in the attempted transmission. The systems and methods described herein may also obtain and display additional information security information about the intended recipient. Additionally, these systems and methods may aggregate records of several attempts to transmit sensitive information and display summaries of the aggregated records categorized by sender, intended recipient, or by the item of sensitive information. By using the familiar metaphor of a postcard, the systems and methods described herein may enable users to quickly and easily identify which applications may be attempting to transmit sensitive data, the data being transmitted, and/or the intended recipient.

Figure 9:
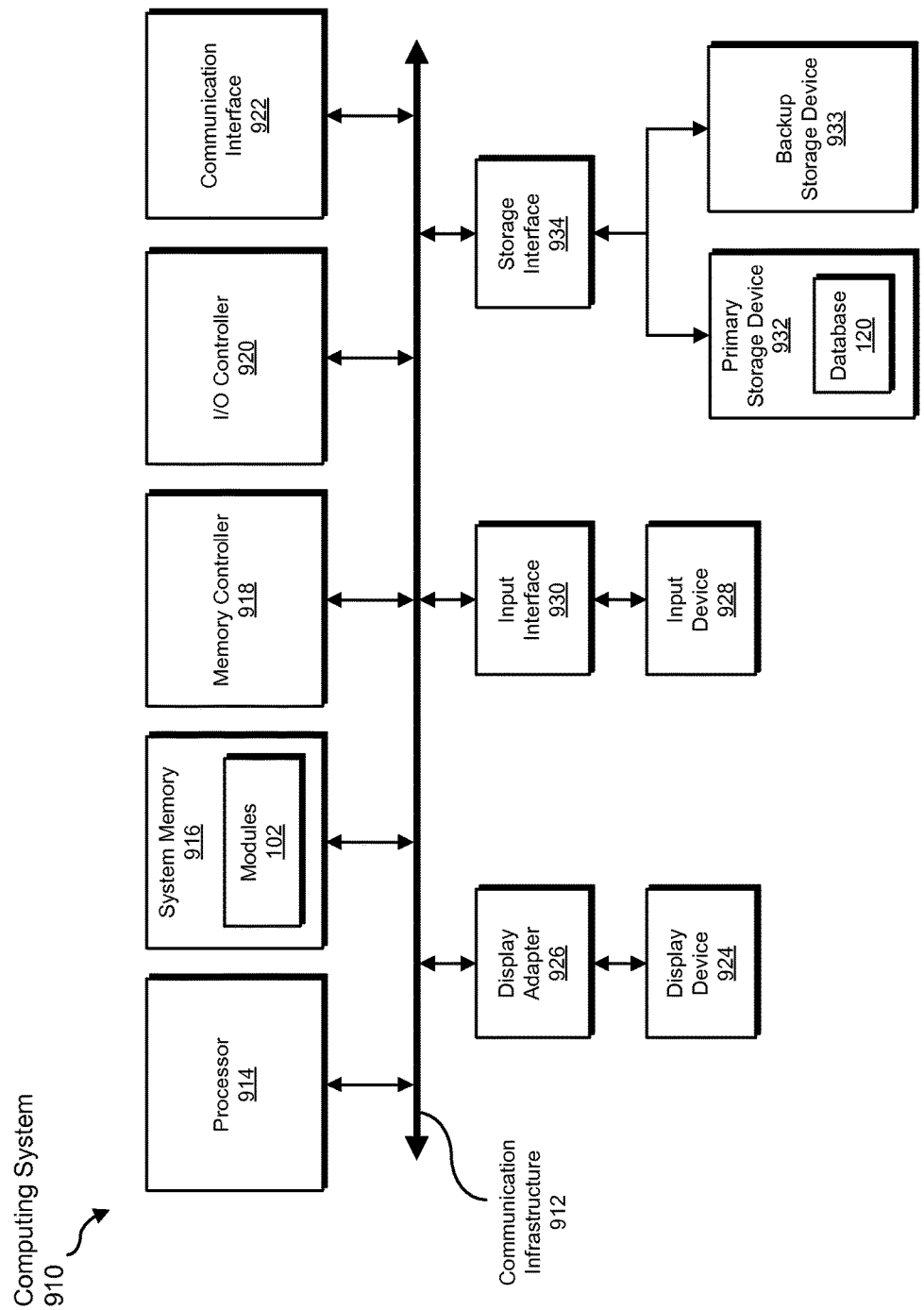
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
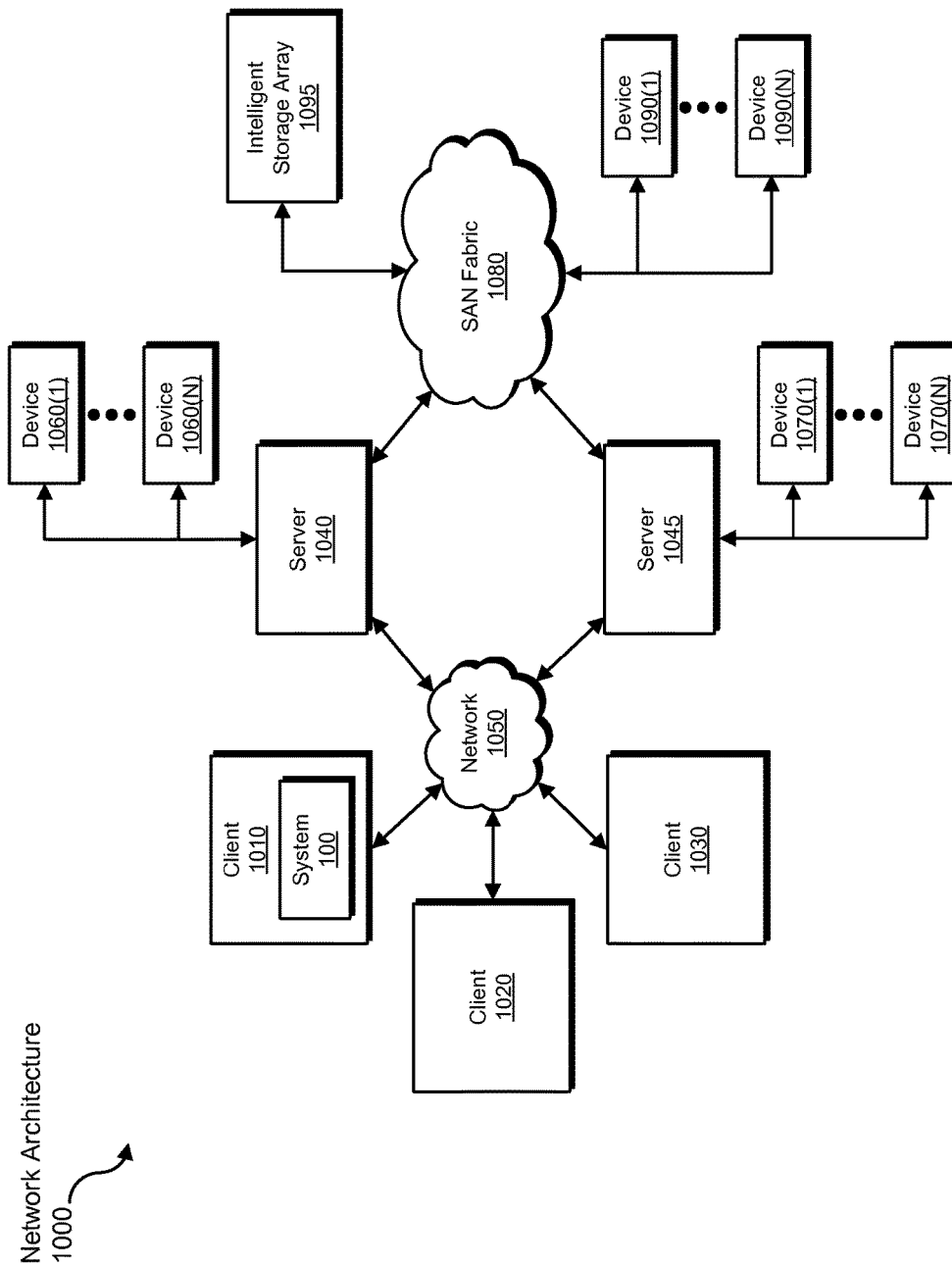
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for reporting the attempted transmission of sensitive information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive attempted transmission data to be transformed, transform the attempted transmission, output a result of the transformation to identify the intended recipient of sensitive data included in the attempted transmission, use the result of the transformation to graphically report the attempted transmission of sensitive information, and store the result of the transformation to aggregate attempted data transmission events. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, performed by a computing device comprising at least one processor, for protecting user data privacy, the method comprising:
   identifying a software program, running on the computing device, to which a user of the computing device granted access to his or her sensitive data when installing the software program;
   monitoring networking hardware on the computing device to detect a plurality of attempts by the software program to transmit data to one or more intended recipients and to identify one or more owners of one or more network resources associated with the intended recipients, the network resources comprising at least one of a network address, a computing device, an Internet domain, and an email account;
   determining that the data of the attempted transmissions includes sensitive information, wherein the sensitive information comprises personal information describing the user;
   aggregating the plurality of attempts into a postcard display that displays summaries of the aggregated attempts, categorized by the software program and by the identified owners;
   notifying a user of the computing device that the software program is attempting to transmit sensitive information and of the intended recipients of the attempted transmissions by displaying the postcard display to the user via a communication interface of the computing device.

2. The computer-implemented method of claim 1, wherein the postcard display comprises at least one of:
   a destination address;
   a return address;
   a message.

3. The computer-implemented method of claim 2, wherein the destination address comprises the intended recipients of the attempted transmissions.

4. The computer-implemented method of claim 2, wherein the destination address comprises at least one of:
   a physical location of the intended recipient;
   a physical location of a data store used by the intended recipient;
   a reputation of the intended recipient;
   a data privacy policy of the intended recipient.

5. The computer-implemented method of claim 2, wherein the destination address comprises an organization having access to data stored by the intended recipient.

6. The computer-implemented method of claim 2, wherein the message comprises a description of the sensitive information.

7. The computer-implemented method of claim 2, wherein the return address comprises the software program that attempted to transmit the data.

8. The computer-implemented method of claim 7, wherein displaying the postcard display further comprises displaying at least one of:
   the number of attempts to transmit the sensitive information;
   the number of software programs that attempted to transmit the data;
   the number of intended recipients of the data.

9. The computer-implemented method of claim 1, wherein identifying the one or more owners comprises at least one of:
   querying an Internet whois database;
   identifying an individual or organizational owner of an email address to which an attempted transmission of sensitive information is directed.

10. A system for reporting the attempted transmission of sensitive information, the system comprising:
    an identification module, stored in memory of a computing device, that:
      identifies a software program, running on the computing device, to which a user of the computing device granted access to his or her sensitive data when installing the software program;
      monitors networking hardware on the computing device to detect a plurality of attempts by the software program to transmit data to one or more intended recipients and to identify one or more owners of one or more network resources associated with the intended recipients, the network resources comprising at least one of a network address, a computing device, an Internet domain, and an email account;
    a security module, stored in memory, that determines that the data of the attempted transmissions includes sensitive information, wherein the sensitive information comprises personal information describing the user;
    an analysis module, stored in memory, that aggregates the plurality of attempts into a postcard display that displays summaries of the aggregated attempts, categorized by the software program and by the identified owners;
    a notification module, stored in memory, that notifies a user of the computing device that the software program is attempting to transmit sensitive information and of the intended recipients of the attempted transmissions by displaying the postcard display to the user via a communication interface of the computing device.

11. The system of claim 10, wherein the postcard display comprises at least one of:
    a destination address;
    a return address;
    a message.

12. The system of claim 11, wherein the destination address comprises the intended recipients of the attempted transmissions.

13. The system of claim 11, wherein the destination address comprises at least one of:
    a physical location of the intended recipient;

a physical location of a data store used by the intended recipient;

a reputation of the intended recipient;

a data privacy policy of the intended recipient.

14. The system of claim 11, wherein the destination address comprises an organization having access to data stored by the intended recipient.

15. The system of claim 11, wherein the message comprises a description of the sensitive information.

16. The system of claim 11, wherein the return address comprises the software program that attempted to transmit the data.

17. The system of claim 16, wherein the notification module displays the postcard display by displaying at least one of:

the number of attempts to transmit the sensitive information;

the number of software programs that attempted to transmit the data;

the number of intended recipients of the data.

18. The system of claim 10, wherein the identification module identifies the one or more owners by at least one of:

querying an Internet whois database;

identifying an individual or organizational owner of an email address to which an attempted transmission of sensitive information is directed.

19. A non-transitory computer-readable medium comprising one or more computer-readable instructions that, when executed by at least one processor of a computing device, cause the computing device to:

identify a software program, running on the computing device, to which a user of the computing device granted access to his or her sensitive data when installing the software program;

monitor networking hardware on the computing device to detect a plurality of attempts by the software program to transmit data to one or more intended recipients and to identify one or more owners of one or more network resources associated with the intended recipients, the network resources comprising at least one of a network address, a computing device, an Internet domain, and an email account;

determine that the data of the attempted transmissions includes sensitive information, wherein the sensitive information comprises personal information describing the user;

aggregate the plurality of attempts into a postcard display that displays summaries of the aggregated attempts, categorized by the software program and by the identified owners;

notify a user of the computing device that the software program is attempting to transmit sensitive information and of the intended recipients of the attempted transmissions by displaying the postcard display to the user via a communication interface of the computing device.

20. The non-transitory computer-readable medium of claim 19, wherein the postcard display comprises at least one of:

a destination address;

a return address;

a message.

* * * * *